United States Patent [19]

Felix et al.

[11] Patent Number: 4,871,412
[45] Date of Patent: Oct. 3, 1989

[54] BONDING THERMOPLASTIC LAYERS VIA ELECTRICAL HEATING

[75] Inventors: Michael C. Felix, Newmarket; Nicola S. Taylor, Cambridge; Colin C. Hardy, Linton, all of England

[73] Assignee: The Welding Institute, Cambridge, England

[21] Appl. No.: 159,726

[22] Filed: Feb. 24, 1988

[30] Foreign Application Priority Data

Mar. 2, 1987 [GB] United Kingdom ............... 8704852

[51] Int. Cl.⁴ ............................................. B32B 31/20
[52] U.S. Cl. .............................. 156/273.9; 156/304.3; 219/10.43; 219/10.53
[58] Field of Search ............... 156/272.4, 272.2, 274.2, 156/273.9, 379.6, 379.7, 304.1, 304.2, 304.3, 304.4, 304.7; 219/10.43, 10.53, 85 A, 535

[56] References Cited

U.S. PATENT DOCUMENTS 4,029,837 6/1977 Leatherman ............... 156/272.4
4,313,777 2/1982 Buckley ....................... 156/272.2

Primary Examiner—Merrell C. Cashion, Jr.
Attorney, Agent, or Firm—Martin Novack

[57] ABSTRACT

A method of bonding a thermoplastic layer (22), such as APC-2, to a substrate (21) in which the thermoplastic layer (22) comprises electrical conductors such as carbon fibres, embedded in thermoplastic material such as PEEK. The method comprises placing the thermoplastic layer (22) in contact with the substrate (21); and inducing electric currents in the conductors whereby heat generated by the currents passing through the conductors causes thermoplastic material to bond the layer to the substrate.

9 Claims, 4 Drawing Sheets

Edge heating effect | Limit of heat affected zone

Edge heating effect

Limit of heat affected zone

Limit of heat affected zone | Maximum heat zones

BONDING THERMOPLASTIC LAYERS VIA ELECTRICAL HEATING

FIELD OF THE INVENTION

This invention relates to the bonding or welding of a thermoplastic layer to a substrate and in particular to the bonding of the so-called advanced thermoplastics which are reinforced with conducting fibres.

DESCRIPTION OF THE PRIOR ART

An example of a suitable thermoplastic is known as APC-2, which is an aromatic polymer composite comprising layers of unidirectional carbon fibres coated in poly-ether-ether-ketone (PEEK) which is a thermoplastic. Such materials may be joined by heating the interface between them by means of a heating element or hot plate such that the local material is raised to a temperature in excess of 350° C. so that the two components may be forged together immediately the heating plate is removed. Similarly interfaces can be heated radiantly and typical heating densities quoted are 75 kW per meter square. This technique has the disadvantage of requiring appreciable time (such as one minute) to allow sufficient heat soak into the material and results in appreciable set-down when the components are forged together.

Alternative heating techniques include the application of ultrasonics at high frequency (in excess of 15 kHz), or vibrating one component with respect to the other at low frequency (usually at less than 200 Hz). The former method is suited to small components but is impractical for large areas of bonding and, while vibration methods have been applied to some thermoplastics, they are not suited to the advanced thermoplastic composites and joint strengths are poor.

A third method relies on heating an interface conductor such as a thin metallic tape or mesh, by direct resistance heating. This method, although reasonably satisfactory, has the disadvantage of introducing a foreign material into the thermoplastic joint. Particularly in hostile environments, corrosion and seepage in association with the metallic material can lead to deterioration of the plastic joint.

A method is proposed, which avoids introducing non-compatible materials and which is both fast in operation and suitable for both spot welds and for long seams, as in the lap joining of large sheets or adding stiffeners or ribs to sheet material.

SUMMARY OF THE INVENTION

In accordance with the present invention, a method of bonding a thermoplastic layer to a substrate, the thermoplastic layer comprising electrical conductors embedded in thermoplastic material, comprises placing the thermoplastic layer in contact with the substrate; and inducing electric currents in the conductors whereby heat generated by the currents passing through the conductors causes thermoplastic material to bond the layer to the substrate.

Typically, the substrate will comprise another thermoplastic layer or composite having electrical conductors embedded in thermoplastic material, the thermoplastic material of each layer generally being the same. In this case, the electrical conductors of both the substrate and thermoplastic layer preferably have the same composition and will typically comprise carbon fibres.

A new approach is proposed in which the current is introduced into the conductors by induction. This should be applied with respect to the consolidated thermoplastic composite sheet, such as APC-2, directly to heat the materials and hence their common interface sufficiently to accomplish a joint, with, or preferably without, pre-preg tape as an intermediary. Pre-preg tape is a suitable implant material for thermoplastic composites including carbon fibres such as APC-2 and comprises unidirectional continuous carbon fibres set in PEEK.

In fact, since the conducting fibres are coated with a thermoplastic and set in a similar material, such as PEEK, there is no reason to expect induction heating to be effective in the same manner as it would be for conducting metals. Indeed experience with such thermoplastic composites has shown that heating at 100 kHz and even at frequencies as high as 400 kHz is ineffective in producing a satisfactory result. On the other hand heating at very high frequencies (dielectric heating), such as at 100 MHz, or even down to 27 MHz is also found to be unsuitable, as it is difficult to control.

Unexpectedly induction heating of the consolidated thermoplastic composite by generating an alternating electromagnetic field in the preferred range of 1–10 MHz has been found to induce sufficient conductive current in the conductors to enable local heating and welding to be accomplished. It is believed that frequencies in the range of 2–4 MHz are particularly suitable for APC-2 material which comprises several layers of the so-called pre-preg tape applied in different directions, such as 0°, +45°, +90°, −45°, etc. At these frequencies, it is believed that sufficient voltage is induced in the carbon fibre to cause breakdown between fibres, between adjacent layers and possibly within one layer, such that circulating currents are achieved via the carbon fibres which are consequently resistively heated. This local heating brings the thermoplastic up to softening or fusion temperature so that overall bonding is accomplished between components, such as between sheets of APC-2.

Conventional induction heating coils are not generally suitable for use with this method due to their bulky nature. We have therefore devised a new form of induction heating coil manufactured by machining a metal block to define an induction coil in the form of a rectangular or square helix. This will be described in more detail below.

BRIEF DESCRIPTION OF THE DRAWINGS

An example of our new induction heating coil and some examples of the effects of induction heating APC-2 material in accordance with the invention will now be described with reference to the accompanying drawings, in which.

DETAILED DESCRIPTION OF AN EMBODIMENT

Figure 1A:
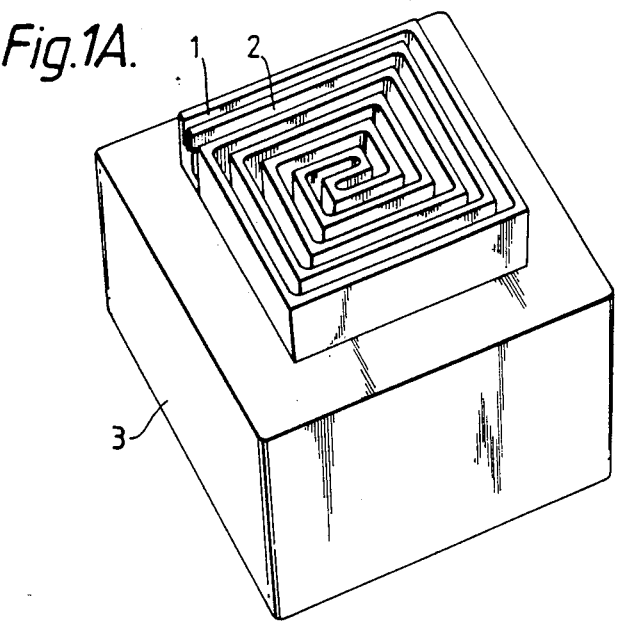
FIGS. 1A and 1B illustrate two forms of induction heating coil at an intermediate stage of their manufacture.

We have designed a compact induction heating coil which is constructed from a solid block 3 of metal. A water channel 1 is cut therein, preferably in the form of a rectangular (FIG. 1B) or square (FIG. 1A) helix, together with an adjacent but deeper channel 2 which forms the air gap between turns (FIG. 1C). The cut paths are then covered on their upper surface with a metal (e.g. brass) plate 4 (FIG. 1D) which is soldered or brazed to the block to form two nominally rectangular channels within the overall helix. The assembly is then parted from the main block (FIG. 1E) such that the deeper air gap path 2 is exposed, but the water channel 1 remains enclosed (intact) so that water coolant can be passed through the coil during use. A continuous gap is then cut in the cover plate in alignment with the channel 2 to provide an air gap or space between the conducting sides of the channel forming the compact rectangular helix. This fabrication technique enables a coil of several turns (such as two or more) to be constructed in a space as small as 30×30 mm. This coil is coupled to a conventional r.f. power supply and may be applied to the materials to be joined to make a single, relatively large, interface spot weld or may alternatively be passed along a lap seam to produce a continuous joint. In either case the coil will be positioned a small distance away from the materials (such as 2 mm), for example by interposing a glass plate. Yet again, reinforcement patches and stiffener ribs may be welded to a given sheet by passing such a coil along the surface of the sheet or patch as required.

Figure 1B:
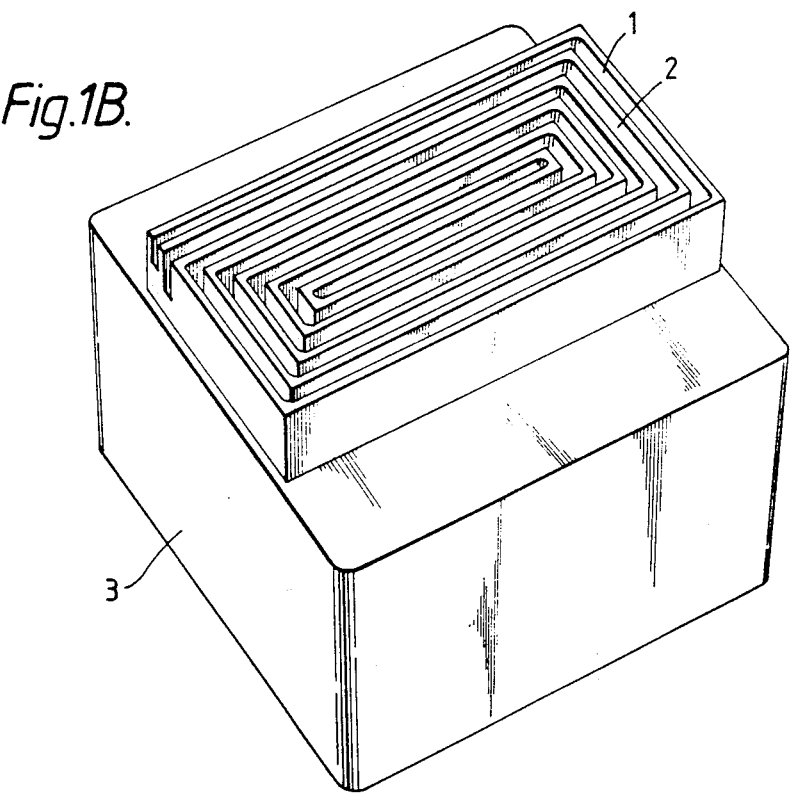
Figure 1C:
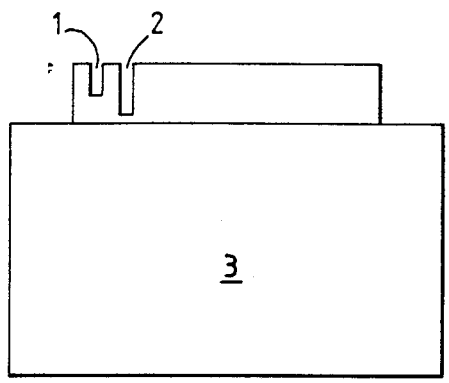
FIGS. 1C–1E are schematic side elevations of an example of an induction heating coil at successive stages during manufacture.
Figure 1D:
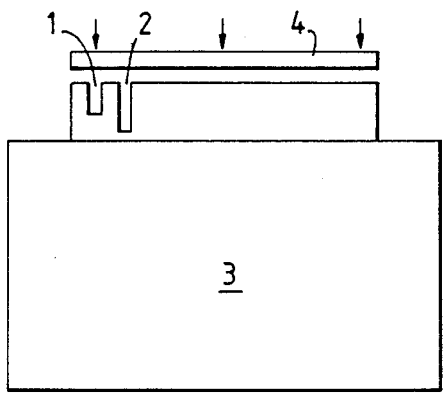
Figure 1E:
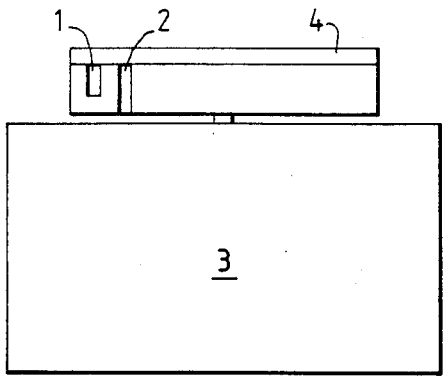
Figure 2:
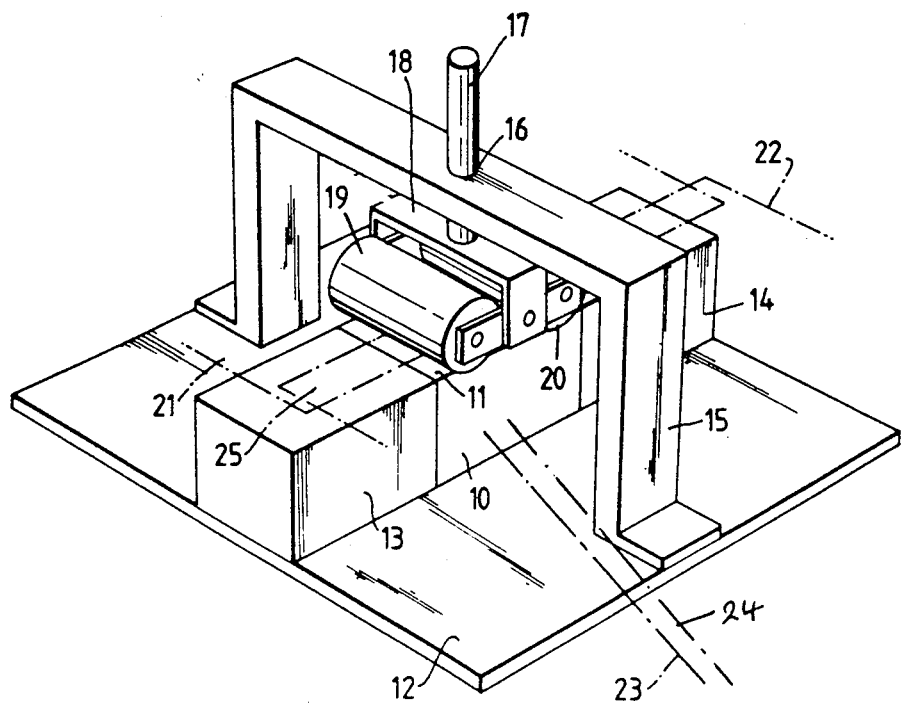
FIG. 2 is a perspective view of apparatus for bonding materials.

An example of apparatus utilising an induction heating coil of the form shown in FIG. 1B is shown in FIG. 2. The finished induction coil (FIG. 1E) is located in a recess (not shown) in a pyrophillite block 10, the upper surface of the coil being covered with a glass plate having an upper surface flush with the upper surface 11 of the block 10. The block 10 is mounted on a base 12 and is positioned between a pair of guide blocks 13, 14 (e.g. of aluminium alloy) each of which has an upper surface substantially flush with the upper surface 11 of the block 10.

A generally U-shaped frame 15 is mounted on the base 12 and this frame has a central opening 16 through which passes a rod 17. The lower end of the rod 17 is fixed to a U-shaped bracket 18 to which is mounted a pair of consolidation rollers 19, 20 positioned above the upper surface 11 of the block 10.

Further pressure and/or guide rolls may be provided in the region of the extended support blocks 13, 14.

RF power is supplied to the coil via water cooled leads 23, 24, shown schematically in FIG. 2, from a power source (not shown). In operation, in order to lap weld a pair of thermoplastic composite sheets 21, 22 of, for example, APC-2, the two sheets are overlapped, and are fed, for example by hand, through the frame 15 with the overlapping region 25 passing beneath the consolidation rollers 19, 20.

RF power is supplied to the induction coil mounted in the block 10 which generates an alternating electro magnetic field with a frequency in the range 2-4 MHz and this causes electrical potentials to be induced in the carbon fibres in the layers 21, 22 of the overlapped region 25 resulting in resistance heating of those carbon fibres and consequent softening or melting of the thermoplastic material or PEEK in which the carbon fibres are embedded. The softened or melted material is consolidated by the rollers 19, 20 so as to bond or weld the thermoplastic sheets 21, 22 together. A consolidation force is applied to the upper end of the rod 17 by a conventional ram or the like (not shown).

In a further method (not shown) a layer of pre-preg tape could be inserted between the sheets 21, 22 in the overlap region 25.

To calibrate the power output from the coil and to ensure reproducibility, the heating effect of the coil on a mild steel sheet suspended above the coil can be monitored using liquid crystals.

Liquid crystal paint (such as BDH Thermodynamics liquid crystal paint indicating 34.2° C.) is coated onto a mild steel plate (e.g. 150 mm×250 mm×1 mm), and a circle 45 mm diameter is marked on the surface. The plate is suspended 16.0 mm above the coil, for best results. At full power output from the 1 kW generator used, the temperature within the marked circle attained at least 34.2° C. within 15 seconds.

This technique does not give an absolute measure of the power transmitted by the coil, but has been found to be a reproducible technique for setting the equipment.

Figure 3:
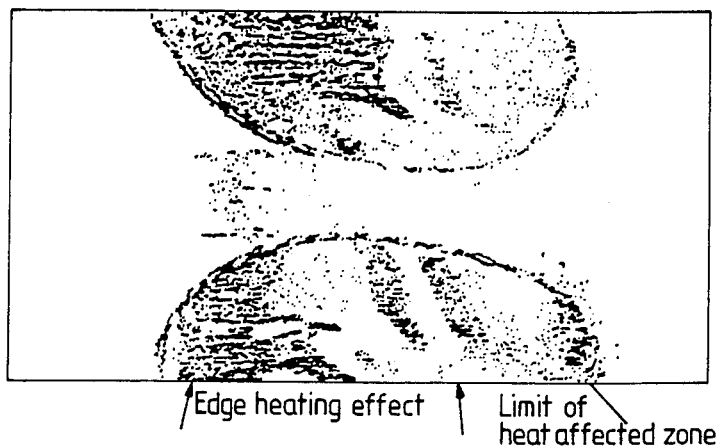
FIGS. 3–5 are photographs illustrating the effect of induction heating on strips of APC-2 of different widths.
Figure 4:
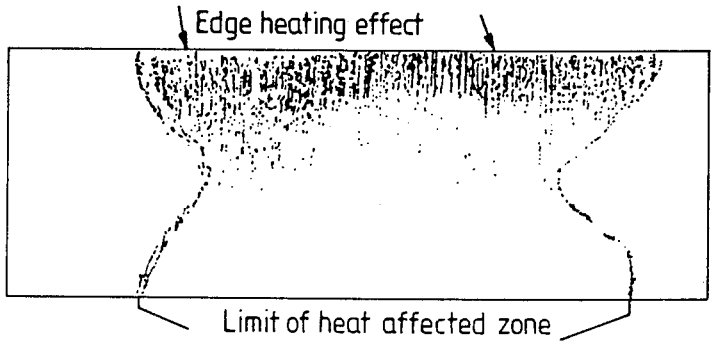
Figure 5:
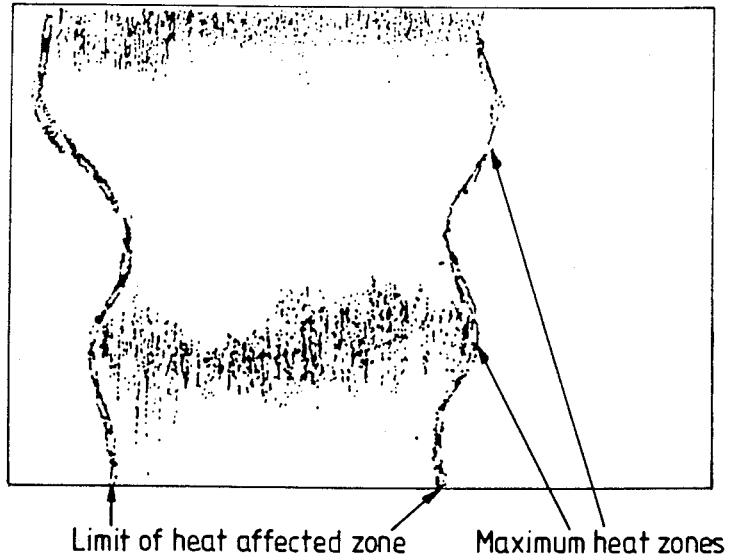

There is a pronounced heating effect in the consolidated APC-2 material which is further enhanced at its edge where, presumably, there is further opportunity for breakdown and conduction between fibres and fibre layers. Thus, in heating a narrow strip (of width equal to or less than the corresponding coil) the edges become preferentially heated, as illustrated in FIG. 3. A similar effect is obtained with an overlap joint between sheets where the exposed edges of the overlap are also preferentially heated. This is advantageous as it ensures that good bonding is obtained while external exposed crevices are eliminated. The tendency for the composite material to delaminate and/or for fibre layers to be distorted if heated excessively is readily overcome by pressurising such exposed surfaces, either during and/or immediately subsequent to the welding operation. Such pressure pads or rolls (e.g. rollers 19, 20) must be of non-metallic material in the vicinity of the coil and preferably of a smooth fine finish. If necessary a mould release compound may be added to the surface of such pressure pads or rolls to avoid stiction to the heated thermoplastic composite.

Where the overlap or width of material between edges is significantly smaller than the corresponding width of the coil the edge effect predominates but is conducted sufficiently rapidly so that the central regions are adequately heated, see FIG. 4. Conversely, where the width of the overlap or strip is significantly greater than that of the induction coil, heated zones are obtained corresponding to the coil dimensions rather than at the exposed edges which are remote from the field, see FIG. 5.

The invention enables local or spot welds to be made as well as continuous seam welds. A patch weld or joint can equally be readily carried out with the induction coil either of similar dimensions to the patch so that the edge effect is directly enhanced or, for a larger patch, to pass the four edges in the vicinity of the coil in turn. It should be noted that with the coil on the same side as the patch the latter is preferentially heated. Conversely, with the coil on the remote side from the patch (that is adjacent to the main sheet) the latter is more heated but the patch will bond when a sufficient temperature has been obtained at the interface with consolidation under applied load.

We claim:

1. A method of bonding a thermoplastic layer to a substrate, the thermoplastic layer and the substrate each comprising at least one layer which consists of substantially unidirectional electrical conductors embedded in and individually coated with thermoplastic material, the method comprising placing said thermoplastic layer in contact with said substrate; and applying an alternating electromagnetic field so as to induce electric currents in conductors whereby heat generated by said currents passing through said conductors causes thermoplastic materials to bond said layer to said substrate.

2. A method according to claim 1, wherein said electrical conductors comprise carbon fibres.

3. A method according to claim 1, wherein said induction step comprises generating an alternating electromagnetic field with a frequency in the range 1–10 MHz.

4. A method according to claim 3, wherein said frequency of the electromagnetic field is in the range 2–4 MHz.

5. A method according to claim 1, wherein said thermoplastic layer comprises an aromatic polymer composite comprising layers of unidirectional carbon fibers coated in poly-ether-ether-ketone.

6. A method according to claim 1, further comprising positioning a further thermoplastic layer on said one thermoplastic layer wherein said one thermoplastic layer is positioned between said substrate and said further thermoplastic layer and wherein said step of applying an alternating electromagnetic field causes said further thermoplastic layer to be bonded to said substrate via said one layer.

7. A method according to claim 1, wherein said conductors in said layer of said thermoplastic layer extend transverse to said conductors in said layer of said substrate.

8. A method according to claim 1, wherein said electromagnetic field is applied by an induction coil having at least two laterally spaced turns.

9. A method according to claim 7, wherein said turns are positioned in a region of 30 mm × 30 mm.

* * * * *